J. B. ENTZ.
SYSTEM OF ELECTRICAL DISTRIBUTION.
APPLICATION FILED MAY 28, 1904.

972,782.

Patented Oct. 11, 1910.
9 SHEETS—SHEET 1.

WITNESSES:

INVENTOR.
Justus B. Entz.
BY
Augustus B. Stoughton.
ATTORNEY.

J. B. ENTZ.
SYSTEM OF ELECTRICAL DISTRIBUTION.
APPLICATION FILED MAY 28, 1904.

972,782.

Patented Oct. 11, 1910.
9 SHEETS—SHEET 2.

J. B. ENTZ.
SYSTEM OF ELECTRICAL DISTRIBUTION.
APPLICATION FILED MAY 28, 1904.

972,782.

Patented Oct. 11, 1910.
9 SHEETS—SHEET 6.

J. B. ENTZ.
SYSTEM OF ELECTRICAL DISTRIBUTION.
APPLICATION FILED MAY 28, 1904.

972,782.

Patented Oct. 11, 1910.
9 SHEETS—SHEET 7.

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SYSTEM OF ELECTRICAL DISTRIBUTION.

972,782.  Specification of Letters Patent.  Patented Oct. 11, 1910.

Application filed May 28, 1904. Serial No. 210,156.

*To all whom it may concern:*

Be it known that I, JUSTUS B. ENTZ, a citizen of the United States, residing at Philadelphia, in the county of Philadelphia and State of Pennsylvania, have invented a certain new and useful System of Electrical Distribution, of which the following is a specification.

Objects of the present invention are to provide a system of electrical distribution including storage batteries and which is especially adapted for train lighting; to provide for charging a storage battery in such a way that it can be fully charged without overcharging it regardless of temperature and other influencing conditions, to provide automatic and reliable means for charging one or more storage batteries upon the establishment of generator voltage and for throwing the battery or batteries into discharge upon failure of the generator voltage; to provide for determining the full charge of a battery or batteries and switching the same off of charge independently of failure of the generator voltage; to relieve the generator of overloads by tripping off some of the batteries being charged and to accomplish this selectively by first tripping off the most fully charged batteries; to so construct and coördinate the various parts of the system of electrical distribution as that the same will operate reliably even under such conditions as are encountered in railway train service; to provide a continuous supply of current from a generator and from storage batteries and at the same time to automatically insure charging, but not overcharging of the batteries and to prevent overloading of the generators; to provide novel apparatus for assisting in the accomplishment of the various objects named or some of them; to insure perfect reliability of the system in starting and operating even after periods of rest.

To these and other ends hereinafter set forth the invention comprises the improvements to be presently described and finally claimed.

The nature, characteristic features and scope of the invention will be more fully understood from the following description taken in connection with the accompanying drawings forming part hereof and in which—

Figures 1, 2, and 3 are diagrammatic views illustrating a system of distribution embodying features of the invention and respectively showing the battery excluded from the circuit, the battery in charging relation to the circuit and the battery in discharging relation to the circuit.

I will proceed to describe the invention in connection with Figs. 1 to 9 of the accompanying drawings.

There is provided on a car indicated between the lines A, A and B, B, (Figs. 1 to 3) a main battery $a$, $a^1$, means for controlling the throwing of the same when fully charged, off charge, such as a pilot cell battery $b$ adapted to become charged prior to the main battery as will be hereinafter described, and an electro-magnetic device provided with a controller, Fig. 4. Upon the locomotive indicated to the left of the line A, A in said figures there is a generator $c$, and an overload circuit breaker $d$, and there may be certain switches to be presently described and the various circuit connections will be explained.

The train or main circuit extends the length of the train and is shown to consist of a conductor 1 which may be doubled back upon itself, so as to equalize the voltage or prevent a drop of voltage at the rear end of the train. This circuit also comprises a conductor 2 and the lamps or translating devices $e$, are arranged across these conductors and are located at appropriate points throughout the train. There are main battery conductors 3, 4, $4^a$, 5, 6, $6^a$, 7, 8, and $8^a$ and pilot cell conductors 9, 10, 11, 12 and 13. There is also a comparatively high resistance switch circuit consisting of conductors 15, 14 and 16 and the latter may be of fine wire.

Figures 4, 8:
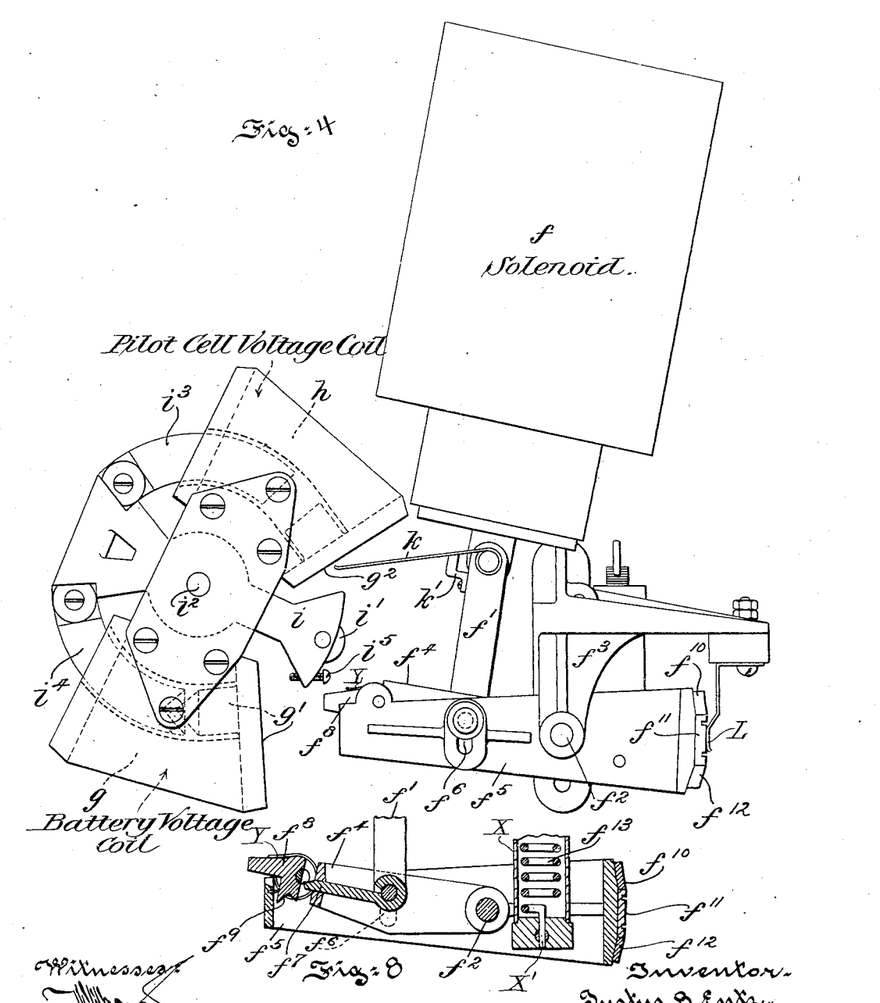
Figs. 4, 5, and 6 are side views of a differential electro-magnetic device provided with a controller embodying features of the invention and showing the positions of its parts which correspond respectively with the conditions illustrated in Figs. 1, 2 and 3.
Fig. 8, is a transverse sectional view of a portion of the same.
Figure 5:
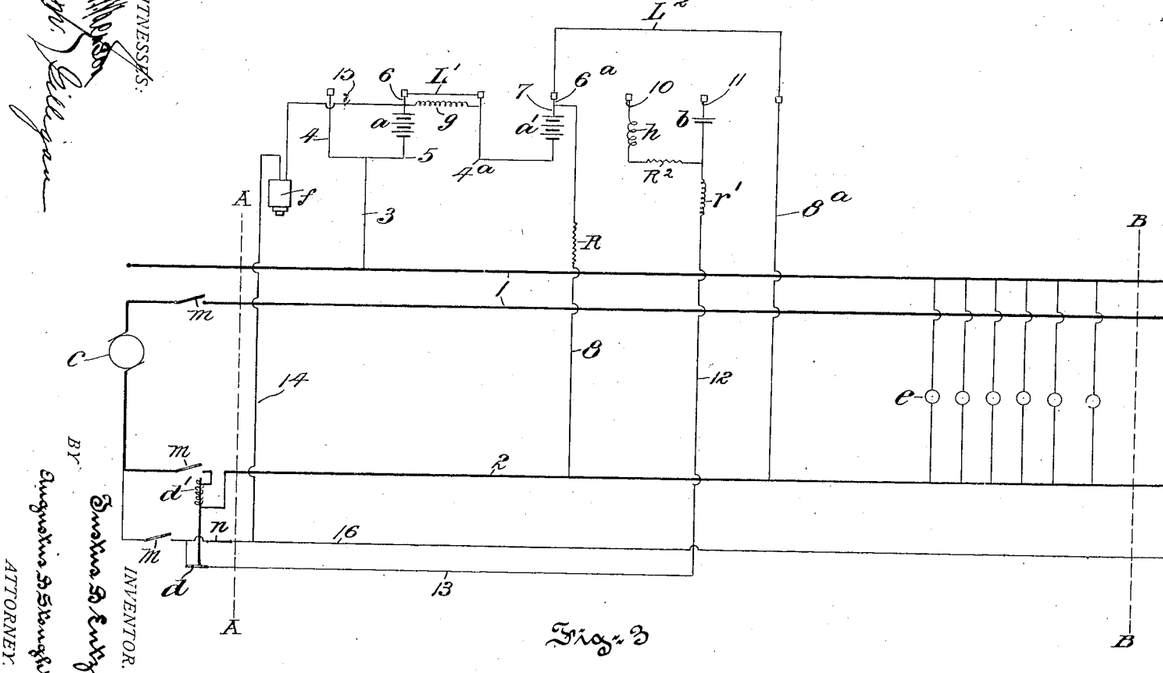

Referring to Fig. 4, $f$ is an electro-magnet which is energized upon the establishment of generator voltage as will be described. As shown the electro-magnet is contained in a casing, but it consists of the usual coil of wire and the usual core. Its core or armature is shown as connected by means of links $f^1$, with a controller arm pivoted as at $f^2$ in a suitable frame or bracket $f^3$. This controller arm consists of two parts $f^4$ and $f^5$ concentrically pivoted as at $f^2$ and capable of lost motion in respect to each other by means of the slot and pin connection $f^6$, and of being locked together so as to move as one or disconnected so as to be capable of independent movement within the limit of the slot and pin connection. The parts $f^4$ and $f^5$ are in the general form of nested hollow rectangles and the part $f^4$ is connected with the links $f^1$, and is provided with a projection $f^7$. The parts $f^4$ and $f^5$, are pivoted together by a pivot $f^2$, Fig. 8. This projection is shown to consist of the point of a steel wire which projects through an opening at the end of the part $f^4$, and is at its other end wound around or secured to the pin of the connection $f^6$. The part $f^5$, is provided with a pivotal trigger $f^8$, one end $f^9$ of which is adapted to engage and disengage the projection $f^7$, and the other end of which projects outwardly for a purpose to be presently described. The pivotal trigger $f^8$, is provided with a spring Y. The part $f^5$, is provided with controller provisions $f^{10}$, $f^{11}$, and $f^{12}$, and it is connected with a spiral spring $f^{13}$, inclosed in a suitable barrel X and attached to the bracket $f^3$. The tendency of this spring is to turn the part $f^5$, into the position shown in Fig. 6. The spring is illustrated as connected pivotally with a pin $X^1$ ranging transversely of the part $f^5$ and located in the rear of the part $f^4$. Normally the spring on the trigger $f^8$, holds the trigger in such position that the part $f^9$, overlies the projection $f^7$, thus the two parts of the controller arm are locked together and are raised and lowered as one piece by the coöperation of the core of the electro-magnet $f$, and the spring $f^{13}$. $i$, is a trip lever shown as provided with a roller $i^1$, which under certain conditions serves to trip the trigger $f^8$. This lever $i$, is pivoted at $i^2$ and is provided with the cores $i^3$ and $i^4$ of solenoids $g$ and $h$. The parts marked $g$, and $h$, are housings or casings which contain the usual coils that are employed with ordinary electro-magnets or solenoids and they are not shown in the drawings because it is believed they are perfectly well understood. The lever $i$, is pivoted at its center of gravity. These cores are of the form of arcs of a circle and they coöperate with the pole pieces $g^1$ and $g^2$. The core $i^4$, is shown as counter-sunk at its end and the pole piece $g^1$ as pointed. This construction effects beneficial results in the operation of the device in that it extends the range of action of the parts. $i^5$, is an adjustable screw or stop the point of which abuts on the casing of the electro-magnet $g$, and thereby fixes the position of the pivotal lever $i$, as shown in Fig. 5, and being an adjusting screw it affords means for adjusting the cores $i^3$ and $i^4$, in respect to their coils and to the magnetic fields thereof. The solenoid $g$, is of fine wire and appertains to the main battery $a$, $a^1$, whereas the solenoid $h$, is of comparatively coarse wire and appertains to the pilot cell $b$. $k$, is a resetting spring or finger which is connected with the core of the solenoid $f$, and projects into range of the part $i$, so as to hit it as shown in Fig. 6, and $k^1$ is a back stop for this spring.

Figures 6, 9:
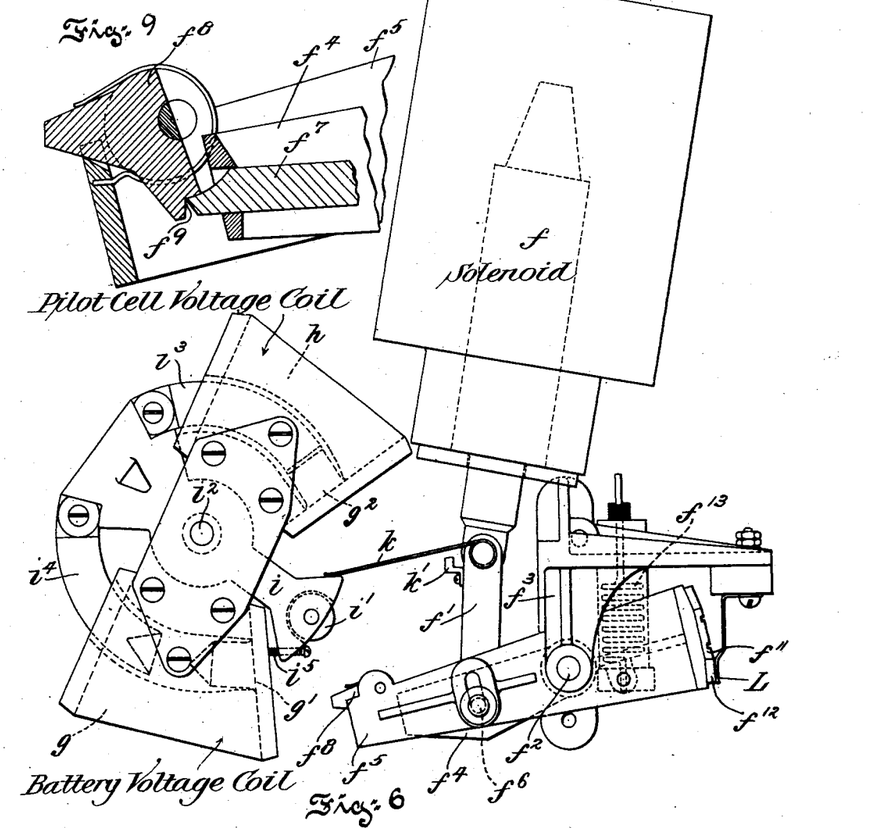
Fig. 9, is a detailed sectional view drawn to an enlarged scale in order to illustrate portions of the device shown in Fig. 8.
Figure 7:
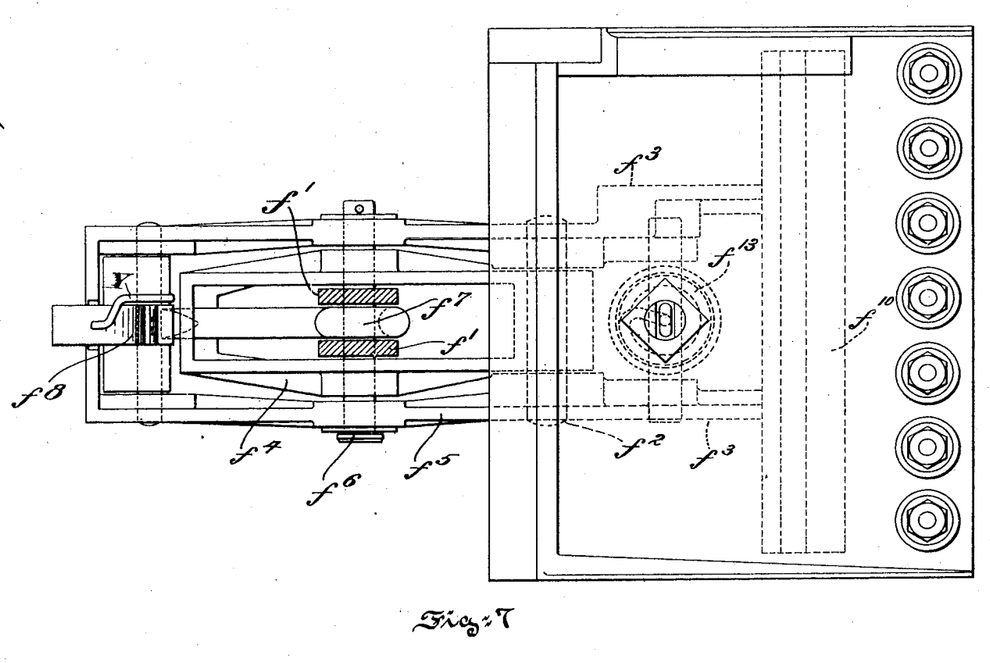
Fig. 7, is a top or plan view of the electro-mechanical device shown in Figs. 4, 5, and 6.
Figure 10:
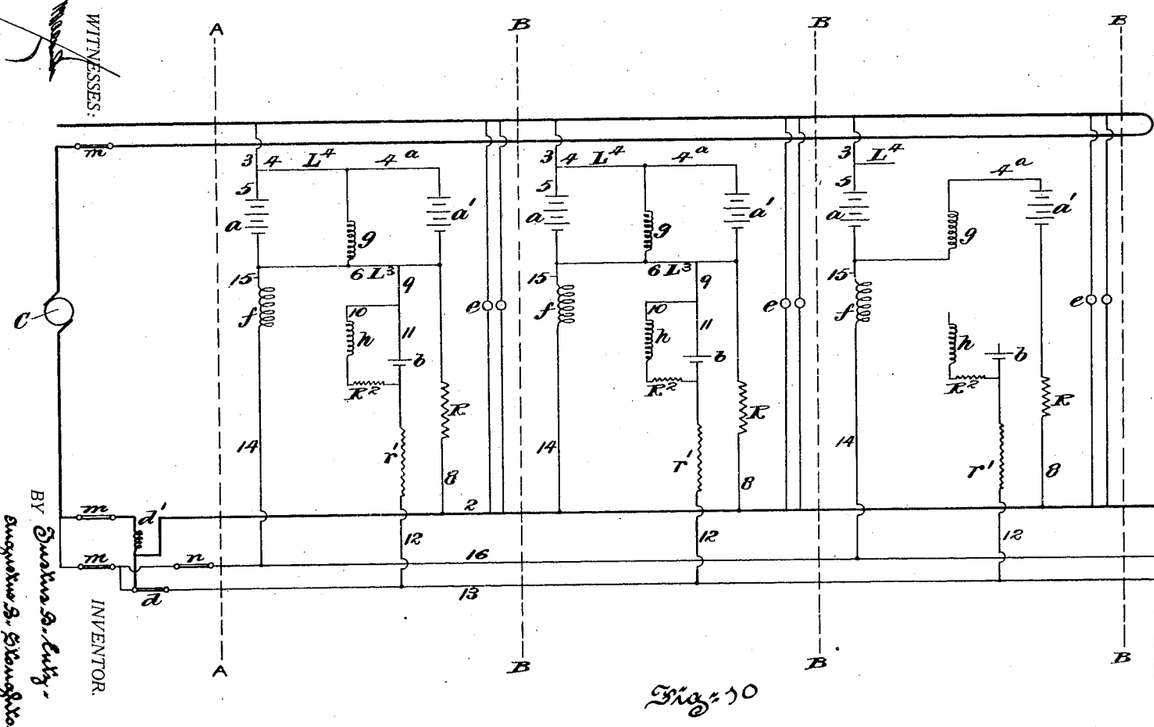
Fig. 10, is a diagrammatic view showing the equipment of a locomotive and three cars, whereof the two nearest the locomotive are charging the batteries and the other is neither charging nor discharging the batteries. The speed controlling coils are shown, but the controller contacts are omitted because they are illustrated in the preceding figures.
Figure 11:
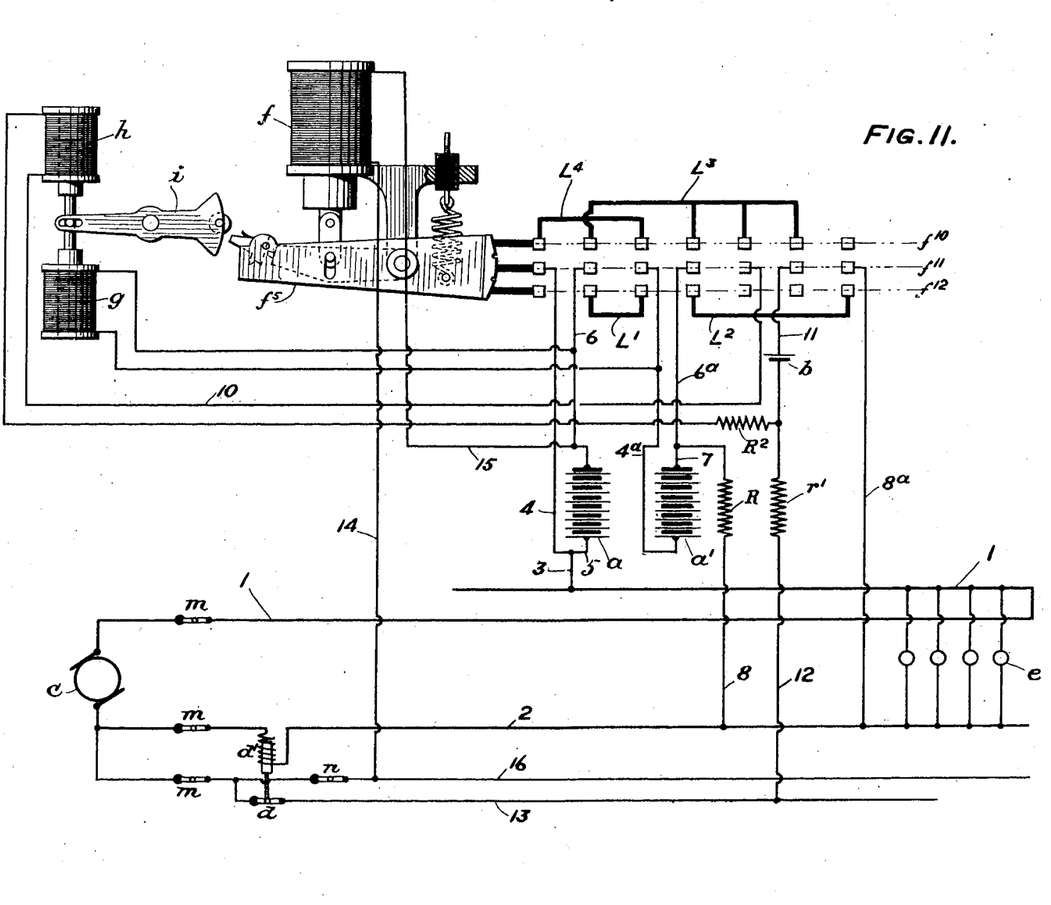
Fig. 11, is a semi-diagrammatic view showing the solenoids, batteries and switch, with connections in operative relation and corresponding to the position of the parts when the battery is off of charge, as in Figs. 1 and 4.

Referring to Fig. 6, the position of the various parts is shown when the solenoid $f$, is not energized, that is to say, when the generator voltage is not established. Such a condition would occur when the locomotive was not connected with the train. Under these conditions the row of contacts $f^{12}$, is in contact with the row of contacts L, which completes a circuit, to be hereinafter described, in such a way that the battery is discharging into the line. The finger $k$, is holding the trip lever $i$, in the position shown; that is to say, with its back stop $i^5$ in proximity with the pole piece $g^1$. If voltage be established in the generator circuit, for example, by the connection of a locomotive and the operation of its generator $c$, the electro-magnet $f$, is energized by way of a circuit that will be hereinafter explained. The result of this is that the whole controller arm is turned into the position shown in Fig. 5, because the trigger $f^8$, is in engagement with the projection $f^7$, as shown in Fig. 9 and the spring $f^{13}$, serves to hold these parts in engagement. During this turning motion of the controller arm the end of the trigger clears the trip roller $i^1$ and the line of controller contacts $f^{10}$, is brought into contact with the line of terminals L. Under these conditions the circuits, which will be described, are such that the batteries $a$, $a^1$, on all of the cars are put on charge. If any or all of these batteries are fully charged, such as are fully charged are cut out. In addition if there is an overload on the generator the batteries may be cut out beginning with those that are most fully charged. These results are accomplished through instrumentalities and circuits which will be presently described and which produce a movement of the trip lever upward. The result of this is that the trip lever roller $i^1$ engages the projecting end of the trigger $f^8$, and turns it so as to clear the projection $f^7$, for example, as indicated in Fig. 8. The result of this is that the part $f^4$ remains stationary, but the part $f^5$ being free is turned by the spring $f^{13}$ to the limits of the pin-and-slot connections $f^6$, with the result that the row of controller blank contacts $f^{11}$, are positioned in contact with the row of terminals L, Fig. 4, and the effect of this is to place the batteries connected with the controller out of the circuit, as will be presently described. Obviously when the generator voltage is not established, for example, when the locomotive is detached, the electro-magnet $f$, is demagnetized and the various parts which have been described are returned to the position shown in Fig. 6; the weight of the core of the solenoid and attached parts assisting in this result and the finger $k$, serving to reset the trip lever.

In Fig. 3, the generator $c$, is disconnected from the circuit and this is indicated by the open switches $m$. In train lighting such a condition of affairs would exist when the locomotive is disconnected. All parts to the left of the dotted line A—A are on the locomotive and between the lines A—A and B—B is included a single car equipment and other similar car equipments may be included in the circuit between the parts separated at B—B. The battery $a$, $a^1$ with its cells in series is discharging by way of the circuit which may be traced as follows: $a$, 6, controller bridge $L^1$, $4^a$, $a^1$, 7, $6^a$, controller bridge $L^2$, $8^a$, 2, lamps $e$, line 1, 3 and 5 back to $a$. In this connection it may be stated that the coil $g$ is of high resistance but as it is bridged by the controller bridge $L^1$, it carries a negligible amount of current. The same is also true of the conductor 8 with the resistance R, as these are bridged by the controller bridge $L^2$ and conductor $8^a$. This places the battery in series across the leads 1—2, across which the translating devices $e$ are arranged so that they receive current from the battery in the ordinary and well understood way, and obviously the electro-magnet $f$, is excluded from the circuit, because its high resistance circuit path, 15, 14 and 16 is interrupted at the latter conductor, the switch $m$, being open and the dynamo $c$, entirely disconnected from the circuit.

Figure 2:
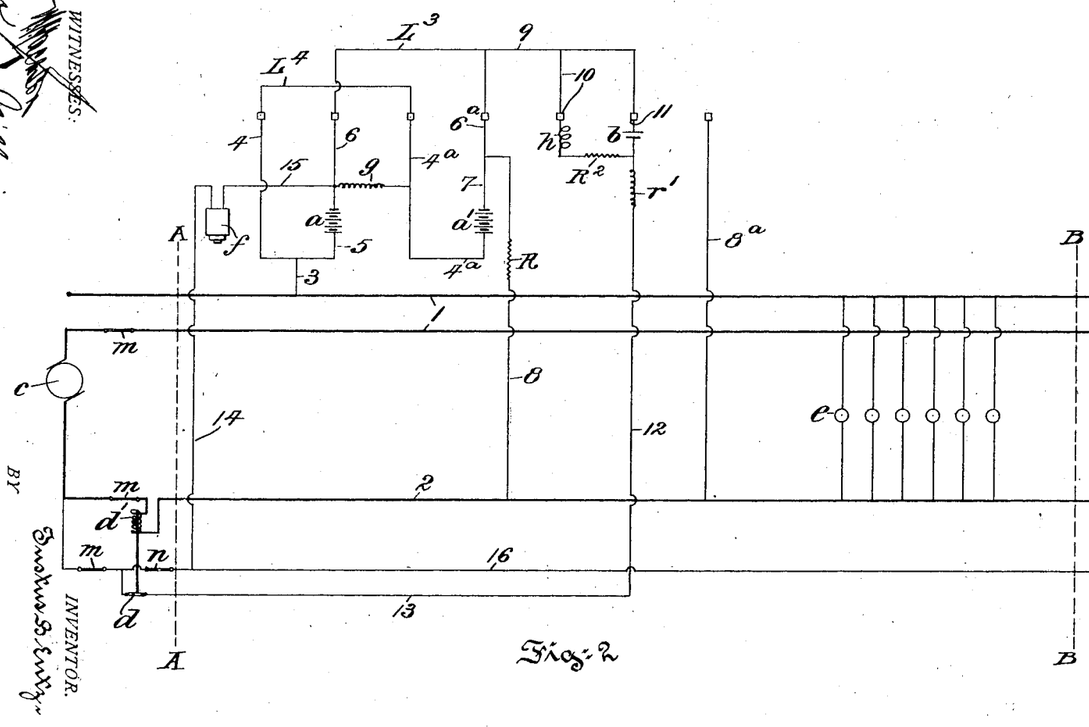

Referring to Fig. 2, a description will be given of the circuits upon the establishment of generator electro-motive-force or in other words, when the locomotive has been coupled to the train and its generator $c$, started. This condition of affairs is illustrated by the closing of the switches $m$ which are shown open in Fig. 3. For the sake of description it might be said that the closing of the switches $n$ and $m$ in the conductor 16 brings the electromagnet $f$ into circuit by way of the following paths, generator $c$, conductors 16, 14, $f$, 15, battery $a$, 5, 3 and 1, back to $c$, thus the coil $f$ is subjected to the difference between the line voltage and the voltage of the half battery $a$, since the battery $a$ and the coil $f$ are thus connected in series across conductors 1 and 16. The result of this is that the core of the solenoid $f$, is drawn upward and shifts the controller arm into the position shown in Fig. 5 as has been described. In consequence of this, the batteries $a$, $a^1$ are placed in parallel relation across the circuit so that they are charged thereby or at any rate are in proper relation to be charged. The circuit (Fig. 2) is then from 1 by 3 whence it divides part going by 5, $a$, 6, controller bridge $L^3$, $6^a$ through charging resistance R by 8 to 2, the other part going by 4, controller bridge $L^4$, $4^a$, $a^1$, 7, through R by 8 to 2. The function of the resistance R, is, since the battery when in series is approximately of the same voltage as the generator circuit and when in parallel is only about half that voltage, to prevent the batteries charging at too high a rate of current. The coil $g$ is of high resistance and is in effect in shunt around the batteries $a$, $a^1$, which are charging in parallel. The branch circuit 15, $f$, 14 and 16 is also of high resistance. At the same time a comparatively high resistance circuit is established by way of conductor 1, from generator $c$ through the paralleled battery $a$ $a'$, the portion 9 of controller bridge $L^3$, 11, $b$, resistance $r^1$, 12 to conductor 13, switch $d$, (which is closed), back to the generator. The voltage across the pilot cell and its resistance $r^1$, is practically the drop in voltage across the resistance R. The voltage of the pilot cell is relied upon to energize the coil H: if the charging current through the paralleled battery changes then the voltage across the resistance R, changes proportionately, causing the current charging the pilot cell to vary accordingly. If the battery $a$ $a^1$, is not fully charged this condition of affairs continues, that is to say, the battery continues to charge because the coil $h$, preponderates in respect to the coil $g$, and keeps the trip $i$ in the position shown in Fig. 5. The coil $h$, under the conditions mentioned preponderates because the pilot cell $b$, is always charged in advance of the batteries $a$, $a^1$. For example, this can be accomplished by employing as a pilot cell a battery which has practically no capacity or very little in respect to the batteries $a$, $a^1$. The coil $h$, is arranged around the pilot cell $b^1$ by means of the conductor 10 and there may be interposed in this conductor a resistance $R^2$ as of iron which serves when cold to allow more current to pass through coil $h$ and thus insure the preponderance of the pilot cell until such resistance becomes sufficiently heated by the current passing through it to be less conductive, and the purpose of this is to insure that the batteries $a, a^1$ will at least start to charge before they are cut out by the preponderance of the battery coil $g$ over the pilot cell coil $h$. As the cells $a, a^1$ continue to charge, the relation of the current passing through the coils $g$ and $h$ changes. The current passing through $h$, as has been said is derived from the cell $b$ and if desired might be said to be due to the difference in potential between the lines 9 and 12, or between the poles of the battery $b$ and as soon as that cell is fully charged the pull of its coil $h$ remains constant, whereas the current passing through the coil $g$ causes its pull to approximate that of the coil $h$ as the batteries $a, a^1$, become charged, and when they are fully charged the coil $g$ preponderates and turns the trip lever as shown in Fig. 4, thus permitting the controller arm $f^5$, to move as has been described into the position shown in that figure. in which the batteries are excluded from the circuit and of course current for the circuit is supplied wholly from the generator $c$. The equipment of each car operates independently of the equipment of the other cars, so that the batteries of any car when fully charged are thrown off independently of the batteries on any other car or cars.

Figure 1:
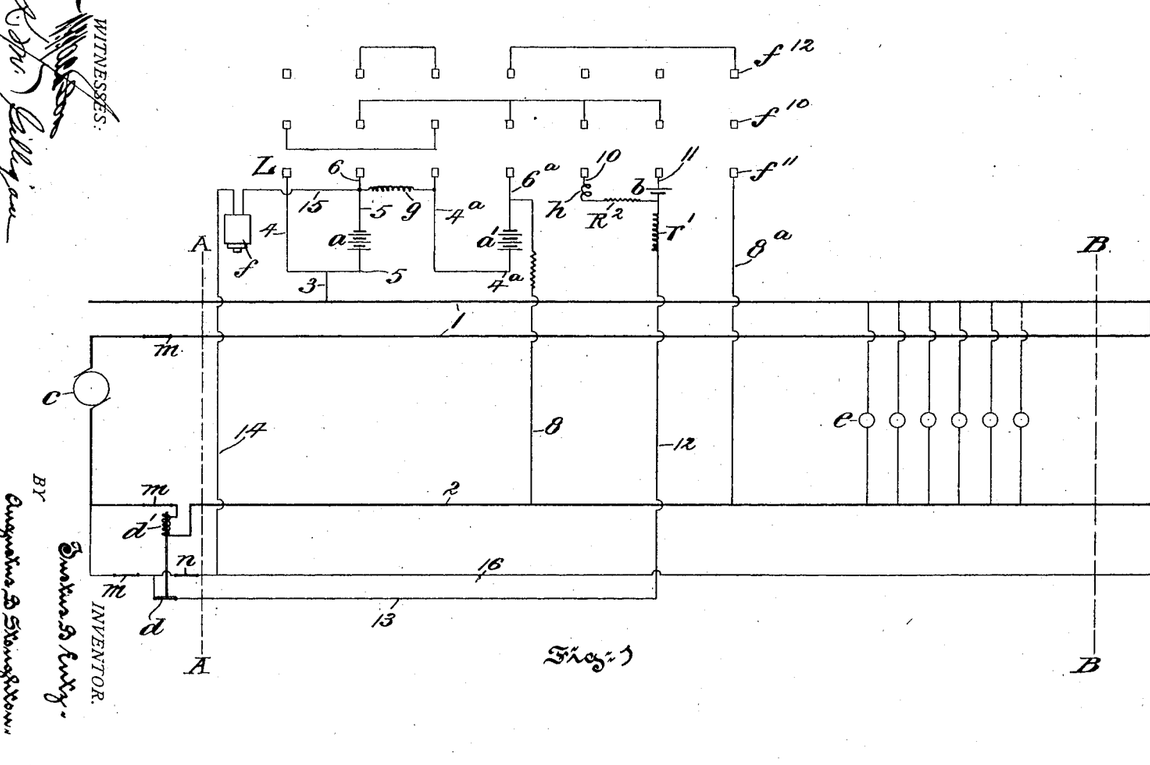

In Fig. 1, at the top, the line L, of contacts is substantially an end view of the line L, of fixed contacts (Fig. 4) and the three rows of contacts $f^{11}$, $f^{10}$, and $f^{12}$, are substantially end views of the three rows of contacts carried by the arm $f^5$, but in transposed relation; naturally the contacts L, are superposed upon one row, the row $f^{11}$, (Fig. 5), has been chosen. Furthermore the row $f^{12}$, has been moved to the top of the sheet as it would crowd the drawing if it were placed below the row $f^{11}$, as in Fig. 4.

Upon the establishment of generator voltage the batteries are all thrown on charge as has been explained, but if the charging of the batteries and the operation of the translating devices $e$, would overload the generator, the result would be that the electro-magnet $d^1$, interposed in the conductor 2 and located on the engine would attract its solenoid or core and open the switch $d$ interposed in the conductor 13. The result of this is to break the circuit through the pilot cells $b$ of all cars, so that the coil $h$ is weakened or deënergized and the coil $g$ operates to shift the trip lever $i$ so as to throw the batteries off of charge. The batteries may be progressively thrown off charge, that is to say, the most fully charged batteries may be first disconnected from the charging circuit. This may be explained as follows in connection with a number of cars: The coil $g$ (Fig. 2) is in effect a high resistance shunt around the batteries which are arranged to be charged in parallel so that the difference in potential across the coil $g$ of the most fully charged battery will be the greatest. The coil $h$ is in effect a shunt around the pilot cell $b$ and since the difference in voltage across the pilot cells in all the cars is substantially the same meaning thereby to all practical intents and purposes, it follows that the coil $g$, of the most fully charged battery will first preponderate over the coil $h$, which appertains to that battery. Otherwise stated, as the difference in potential across the batteries varies according to the charge and as the coils $g$ have the same resistance, the coil of the most fully charged battery will have the most current flowing through it and will therefore operate first. As a result of this, the trip lever $i$ which appertains to the most fully charged battery will operate to shift its complemental controller arm and throw the most fully charged battery off of charge. The same effect will be produced successively throughout the train until the overload is relieved. Subsequently the switch $n$ may be opened so as to interrupt the current through all the solenoids $f$, thus bringing all the controllers in the same position. The switch $n$ is then closed thus bringing all the batteries onto charge and permitting the system to operate as has been described.

Referring to Fig. 3, it is obvious that if the switch $n$, in the conductor 16, be opened and the switches $m$ be closed, the batteries and generator will be in parallel across the line and that the electro-magnet $f$, is not energized. Under these conditions the battery and generator work in such a way that the battery is charged at times of light load and discharges at times of heavy load. The pilot cell or battery, when present, should have substantially the same characteristics, such as temperature, electrolyte density, etc., as the main battery and it should be adapted to become fully charged prior to the main battery.

The pilot cell should be a reproduction as to substantial characteristics of the cells which make up the main battery and the pilot cell is always charged in advance of the main batteries of the corresponding set; that is to say, the main batteries which it controls. This can be accomplished by charging the pilot cells in series with the paralleled parts of the main battery, or otherwise.

The operation of a storage battery is affected by temperature changes, condition of charge, and whether charging or discharging. The pilot cell can be arranged to be exposed to the same conditions of temperature as the main battery and its characteristics under different conditions may be made substantially the same as those of the main battery, hence when the main battery is cut out by an instrument in which the voltage of the fully charged pilot cell is opposed to the voltage of the main battery and by which when the latter exceeds the former, the main battery is cut out, it follows that the operation will take place properly under the varying conditions which may arise and under the varying characteristics of the batteries. The pilot cell may be kept charged in advance of the main battery by charging it in series with paralleled parts of the main battery as has been stated, or a cell may be used for a pilot cell, which has practically no capacity and therefore reaches a state of full charge more rapidly than an ordinary storage battery would do on the same circuit.

It will be obvious to those skilled in the art to which my invention relates that modifications may be made in details without departing from the spirit thereof, hence I do not limit myself to the precise mode of structure or procedure, but

Having thus described the nature and objects of my invention, what I claim as new and desire to secure by Letters Patent is—

1. The combination of a main battery, a pilot cell, circuit connections for passing current through said main battery and causing the pilot cell to first become fully charged, and two opposing magnets and means controlled thereby, one of said magnets controlled by the pilot cell voltage and the other by the main battery voltage and said means operating to cut out the main battery when the effect of its voltage overpowers the effect of the voltage of the pilot cell, substantially as described.

2. The combination of a main battery, a pilot cell having substantially the same characteristics as the main battery, circuit connections for passing current through said batteries under like conditions and causing the pilot battery to first become fully charged, and means for opposing the effect of the fully charged pilot cell and the effect of the main battery and for cutting the latter off charge when its effect preponderates, substantially as described.

3. The combination of a main battery, a pilot cell, circuit connections for passing current through said batteries and causing the pilot cell to first become fully charged, means for opposing the effect of the main battery and the effect of the pilot cell, and devices responsive to said means for interrupting the circuit through the main battery.

4. The combination of a main battery, a pilot cell, having substantially the same characteristics as the main battery, circuit connections for passing current through said batteries under like conditions and causing the pilot battery to first become fully charged, means for opposing the effect of the main battery and the effect of the fully charged pilot cell, and devices responsive to said means for interrupting the circuit through the main battery.

5. The combination of a main battery, a pilot cell having substantially the same characteristics as the main battery, circuit connections for passing current through said batteries under like conditions to first fully charge the pilot cell, devices responsive to the state of charge of the main battery and pilot cell, and means controlled by said devices and adapted to throw the main battery off charge, substantially as described.

6. The combination of a main battery, a pilot cell, circuit connections for passing current through said battery and cell and charging the cell in advance of the battery, and an electro-magnetic device and its circuit connections relatively responsive to the condition of charge of said battery and pilot cell and provided with controller connections, substantially as described.

7. The combination of a main battery, a pilot cell, a charging circuit, and an electro-magnetic device having circuit connections and provided with means adapted to interrupt the charging circuit, and said devices responsive to the relative conditions of charge of the main battery and pilot cell, substantially as described.

8. The combination of a generator, circuit connections, a plurality of batteries in multiple relation to the generator and to each other, electro-magnetic switches appertaining to each of said batteries and responsive to the establishment of generator voltage and to the failure of generator voltage for throwing the batteries into charge upon establishment of such voltage and into discharge upon failure of such voltage, and tripping devices coöperating with said switches for determining the full charge of their corresponding batteries and switching them when fully charged off of charge independently of generator voltage.

9. The combination of a generator, circuit connections, a plurality of batteries in multiple relation to the generator, an electro-magnetic switch for each battery which throws the battery in two paralleled parts into charge upon establishment of generator voltage and throws it into discharge upon failure of generator voltage, and a device for each battery for selectively switching that battery when fully charged off of charge independently of failure of generator voltage, substantially as described.

10. The combination of a generator, circuit connections and translating devices, a plurality of batteries in multiple relation to the generator, an electro-magnetic switch for each battery which throws its battery into charge upon the establishment of generator voltage and throws its battery into discharge upon failure of generator voltage, and means for relieving the generator of overload due to charging batteries by excluding a battery or batteries from the charging circuit independently of failure of generator voltage, substantially as described.

11. The combination of a plurality of batteries in multiple relation and their charging circuit, and means responding to the condition of charge of each battery and adapted upon an overload on the circuit to first exclude the most fully charged batteries from the charging circuit, substantially as described.

12. The combination of a main battery, a pilot cell, a circuit controller and its circuit, a trip lever, and electro-magnets whose armatures are connected with said lever and whose coils are respectively connected one with the main battery and one with the pilot cell, substantially as described.

13. The combination of a main battery, a pilot cell, a pivotal trip lever carrying armatures in the form of arcs of circles, coils for said armatures whereof one is connected with the main battery and the other with the pilot cell, and controller provisions and their circuit responsive to the trip lever, substantially as described.

14. The combination of a pivotal trip lever, two arc-shaped cores attached thereto and whereof one is provided with a countersunk end, coils provided with pole pieces whereof one projects for coöperation with said counter-sunk portion, and a main battery and a pilot cell connected respectively with said coils, substantially as described.

15. The combination of an electro-magnet, a controller arm consisting of two parts whereof one carries the controller contacts and the other is connected with the armature of the electro-magnet, a trigger for connecting and dis-connecting said parts, a trip lever for tripping the trigger, electro-magnets for operating the trip lever, and circuit connections, substantially as described.

16. The combination of a controller arm, an electro-magnet connected with the controller arm, a trip lever, a resetting finger connected with the electro-magnet and adapted to reset the trip lever, magnets for operating the trip lever, and circuit connections, substantially as described.

17. The combination of a generator, a main battery, a pilot cell, an electro-magnet responsive to generator voltage, a two-part controller arm whereof the parts are normally connected together and are both operated when said magnet is energized to put the battery on charge and when it is not energized to put the battery on discharge, a trip lever adapted to dis-connect the parts of said arm to exclude the battery from the circuit, electro-magnets for operating the trip lever, and circuit connections, substantially as described.

18. The combination of a main battery, a controller and its connections for placing the main battery in charging and discharging relation and for excluding it from the circuit, a generator, an electro-magnet connected with the controller and responding to generator voltage to place the battery in charge or discharge, a pilot cell, a trip lever coöperating with the controller to place the battery out of the circuit, and electro-magnets for operating the trip lever and whereof the coil of one is arranged across the main battery and the coil of the other across the pilot cell during charging, substantially as described.

19. The combination of a generator, circuit connections, a plurality of batteries, electro-magnetic switches appertaining to each of said batteries and adapted to throw same into charge upon establishment of generator voltage and into discharge upon failure of generator voltage, tripping devices coöperating with said switches for determining the full charge of its corresponding battery and switching it when fully charged off of charge independently of generator voltage, and means responsive to an overload and coöperating with said tripping devices for successively throwing the most fully charged batteries off charge and thereby relieving the generator.

20. The combination of a main battery, a circuit controller and its circuit, a pivotally movable member comprising a trip and an armature, the movable member so balanced that its center of gravity is coincident with the pivot, a fixed magnet coil connected with the main battery, and means connected with said movable member for opposing the pull of said magnet coil upon the armature to a predetermined degree, substantially as described.

21. In combination a main battery, a charging circuit, an electro-mechanical switch for cutting the battery off charge said device responsive to the battery voltage, and means operatively arranged in respect to said switch and adapted to oppose the effect of the battery voltage, which means includes a pilot cell and a charging conductor therefor the resistance of the conductor being less when it is cold than when it is hot, substantially as described.

In testimony whereof I have hereunto signed my name this 27th day of May 1904.

JUSTUS B. ENTZ.

In the presence of—
K. M. GILLIGAN,
W. J. JACKSON.